United States Patent [19]

Dillon et al.

[11] 4,016,597

[45] Apr. 5, 1977

[54] COLOR VIDEO CAMERA WITH SELECTIVELY EXPANDED SENSITIVITY

[75] Inventors: Peter L. P. Dillon; James J. DePalma, both of Pittsford, N.Y.

[73] Assignee: Eastman Kodak Company, Rochester, N.Y.

[22] Filed: Sept. 11, 1975

[21] Appl. No.: 612,512

[52] U.S. Cl. .......................... 358/41; 178/DIG. 8; 178/DIG. 29; 358/113
[51] Int. Cl.² ...................... H04N 9/04; H04N 5/30
[58] Field of Search ............... 178/7.1, 7.2, DIG. 8, 178/DIG. 29; 358/21, 37, 41, 113, 211, 27

[56] References Cited

UNITED STATES PATENTS 3,748,383  7/1973  Grossman ......................... 178/7.2

*Primary Examiner*—Robert L. Richardson
*Attorney, Agent, or Firm*—G. E. Grosser

[57] ABSTRACT

Primary color filters which also pass infrared are employed in cooperation with a broad-spectral-response, image sensing apparatus to provide a color video camera which has an extended range of operation at low light levels. The image beam which reaches the image sensing apparatus is selectively controlled by a regulatable infrared filtering device in cooperation with such primary color filters. Upon detecting a normal light level, the infrared filtering device responds by blocking infrared. At low light levels, on the other hand, infrared blocking is negated and infrared passes through some or all of the primary color filters to augment the faint visible light components which are imaged on the image sensing apparatus.

9 Claims, 13 Drawing Figures

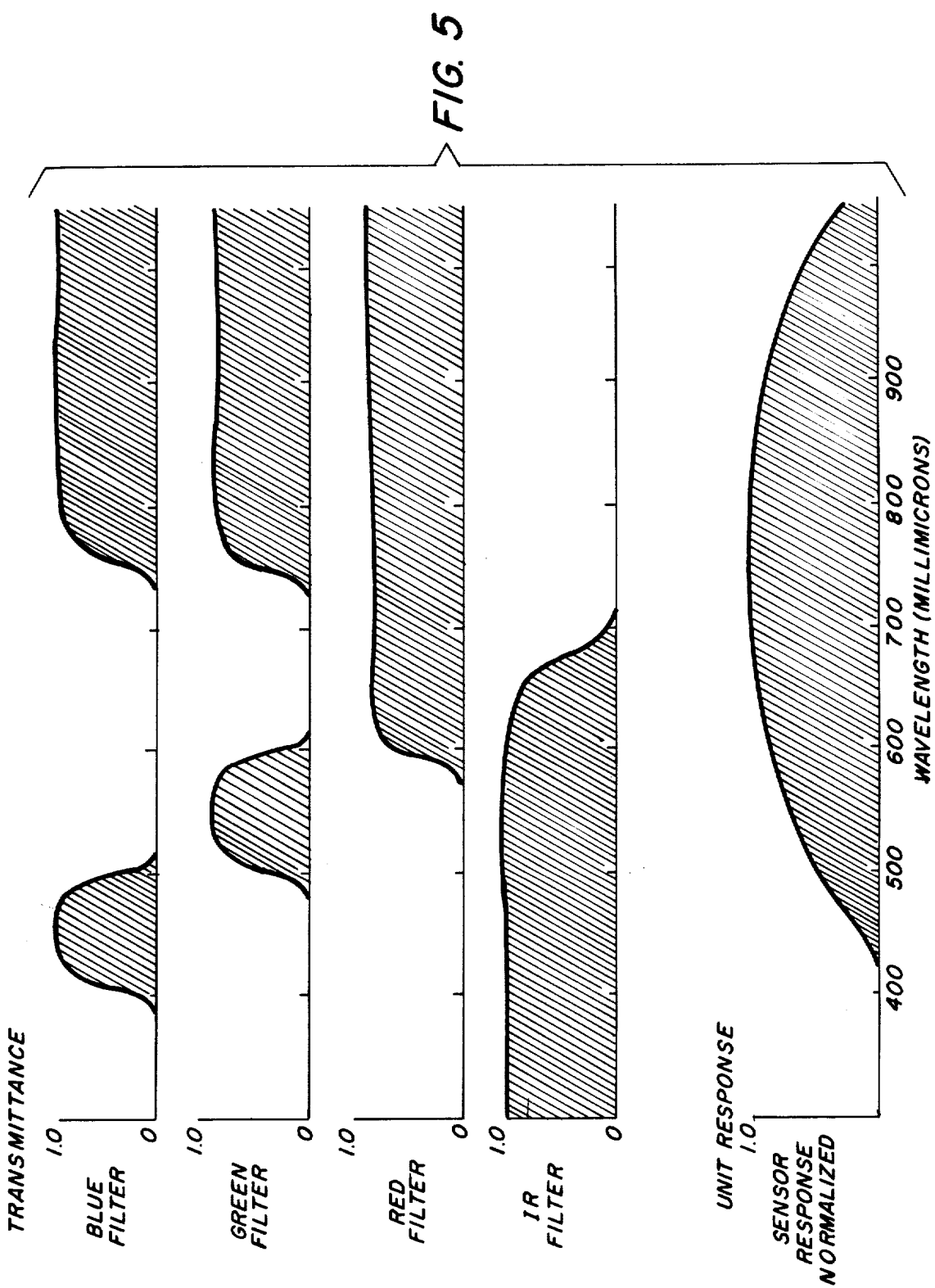

| | FILTER | OPERATIONAL ZONE | ACTION | STATUS |
|---|---|---|---|---|
| BRIGHT | IN | I | -- | COLOR |
| DECREASING LIGHT ↓ | IN | II | -- | COLOR |
| | IN | III | REMOVE IR FILTER | MONOCHROME |
| | OUT | II | -- | MONOCHROME |
| DARK | OUT | III | SET TOO DARK FLAG | TOO DARK |
| INCREASING LIGHT ↓ | OUT | II | RESET TOO DARK FLAG | MONOCHROME |
| | OUT | I | ADD IR FILTER | COLOR |
| | IN | II | -- | COLOR |
| BRIGHT | IN | I | -- | COLOR |

COLOR VIDEO CAMERA WITH SELECTIVELY EXPANDED SENSITIVITY

BACKGROUND OF THE INVENTION

1. Field of the Invention

This invention relates generally to color video cameras and, more particularly, to apparatus for extending the lighting range over which a color video camera can operate satisfactorily.

2. Description Relative to the Prior Art

To enhance the usefulness of a color video camera, it is desirable to incorporate therein a capability for existing light operation at low light levels. One straightforward way to extend color camera operation to low light levels is to utilize lenses having high light gathering power. There are, however, practical limits to this approach beyond which camera operation is desirably extended.

It is also known for certain types of video cameras, generally those using imaging tubes, to use special apparatus to increase the effective sensitivity of the imaging device (e.g., see U.S. Pat. No. 3,848,085) and thereby provide for operation over a wider range of light levels. This approach, however, becomes increasingly complex and expensive as continued reductions in the minimum acceptable light level are attempted, particularly for a color camera having plural sensors and the attendant need that such sensors be balanced sensitivity-wise.

A somewhat different approach to extending camera operation utilizes image information from the infrared portion of the spectrum when low light levels are encountered (e.g., see U.S. Pat. No. 3,748,383). This technique recognizes that for many low light level scenes, i.e., from a visible light standpoint, a significant level of infrared is present (e.g., candlelight scenes and firelight scenes).

It would be desirable to extend the range of operation for color cameras by utilizing infrared image information to produce a black-and-white image at very low light levels. A changeover to receive infrared image information should not, however, require a repositioning of the spectrally selective apparatus of the color camera (i.e., the apparatus which separates the image beam into a set of three primary colors), because such repositioning would present serious problems in registering the various color images. Moreover, such changeover is desirably effected automatically and by apparatus adapted to cooperate with semiconductor imaging devices.

SUMMARY OF THE INVENTION

To extend the range of operation of a color video camera, the invention proposes to selectively modify the spectral content of the camera's image beam by utilizing primary color filters, of the type that "open up" in the infrared portion of the spectrum, in cooperation with a filter apparatus that regulates infrared in accordance with a measurement of image beam intensity. With this technique, it becomes possible to eliminate any corruption, by infrared, of the color image information which is derived from the image beam at normal lighting levels while, nevertheless, causing the faint visible image to be augmented by infrared at low light levels:

In achieving such operation over an extended lighting range, a color video camera according to the invention utilizes one or more imaging devices (e.g., charge-coupled imaging arrays) having broad spectral sensitivity, which devices cooperate with a light control apparatus having the spectrally selective characteristics discussed above. Under adequate lighting conditions (e.g., based on a measure of the average "green" light level), the light control apparatus works to block infrared within the image beam from the primary color sensors of the imaging device(s) while, at the same time, directing the remaining visible light to respective primary color sensors. When low light level conditions are detected, on the other hand, the light control apparatus responds by nullifying the infrared blocking function and causes an infrared image beam component to be applied to at least some, but preferably all, of the image sensors, to supplement the faint visible light image falling on such sensors.

With spectrally selective image beam modification according to the invention, the set of filters for isolating primary colors may remain stationary in the image beam because, as indicated above, that set of filters is chosen to pass infrared and, therefore, need not be removed in order to apply infrared to the imaging device(s). The infrared filter, on the other hand, serves in exercising selective control over the infrared beam component, such control preferably being regulated in accordance with an average of the output signals of the imaging devices (a measure of image beam intensity).

In a presently preferred implementation of the invention, a semiconductor imaging array is utilized having a superposed mosaic of primary color transmission filters which serve to effect color separation. Each filter of the mosaic passes one primary color and infrared, thus requiring two passbands. For normal light levels, the above-mentioned infrared filter is placed within the image beam, thereby nullifying the common infrared passband of the primary color filters and causing the primary color filters to pass to the array only primary color images (and no more). For low light level operation, on the other hand, the infrared filter is dropped out of the image beam (or is regulated to transmit some of the infrared band), causing the "nullified" infrared passbands of the primary color filters to become operative. Accordingly, at low light levels, infrared passes to the image sensors and such infrared supplements the visible light image information which routinely passes through the primary color filters.

For such low-light-level operation, preferred forms of the control apparatus include a switching device cooperative with the signal processing apparatus of the camera, which device automatically causes a changeover to monochrome camera operation. For example, in a camera which produces a video signal in the NTSC format, the switching device may disable the 3.58 MHz NTSC chrominance subcarrier during low light level operation and, hence, leave only the monochrome "luminance signal" during such operation. Such a changeover to monochrome operation avoids the production of the distractingly unnatural color (when the video signals are used to produce a display), which would otherwise result with the application of the infrared image to the color image sensors. In this regard, it should be noted that a monochrome display based on the augmented image (visible and infrared) tends to resemble the corresponding visible monochrome image and, therefore, generally provides a useful image representation.

In utilizing transmission-type primary color filters to practice the invention, as in the case of the above-described implementation, a problem can arise because the primary filter dyes tend to deteriorate as a result of continued exposure to light. As a consequence, such filters may become ineffective in isolating the primary colors. To minimize this problem, the invention in one aspect utilizes a regulator which is adapted to block both infrared and visible light from the primary color filters when the camera is not operating. Filter fading is, accordingly, limited to occur only during periods of camera utilization when light is applied to the primary color filters.

BRIEF DESCRIPTION OF THE DRAWINGS

The invention will be described in detail with reference to the figures, wherein:

FIG. 5 indicates graphically characteristics for various devices employed in apparatus according to the invention;

Referring to FIG. 1, a light modulating apparatus 2 according to the invention (represented in simplified block form) operates upon the image beam projected by a set of camera optics 4 onto an imaging apparatus 6 having broad spectral response (reference to broad spectrum is therein intended to describe a spectral range comprising the visible spectrum and some or all of the infrared wavelength band). Included in the modulating apparatus for modifying the image beam are a controllable broad spectrum beam regulator 8, a spectrally selective beam regulator 10, and a spectrally selective beam separator 12.

Figure 1:
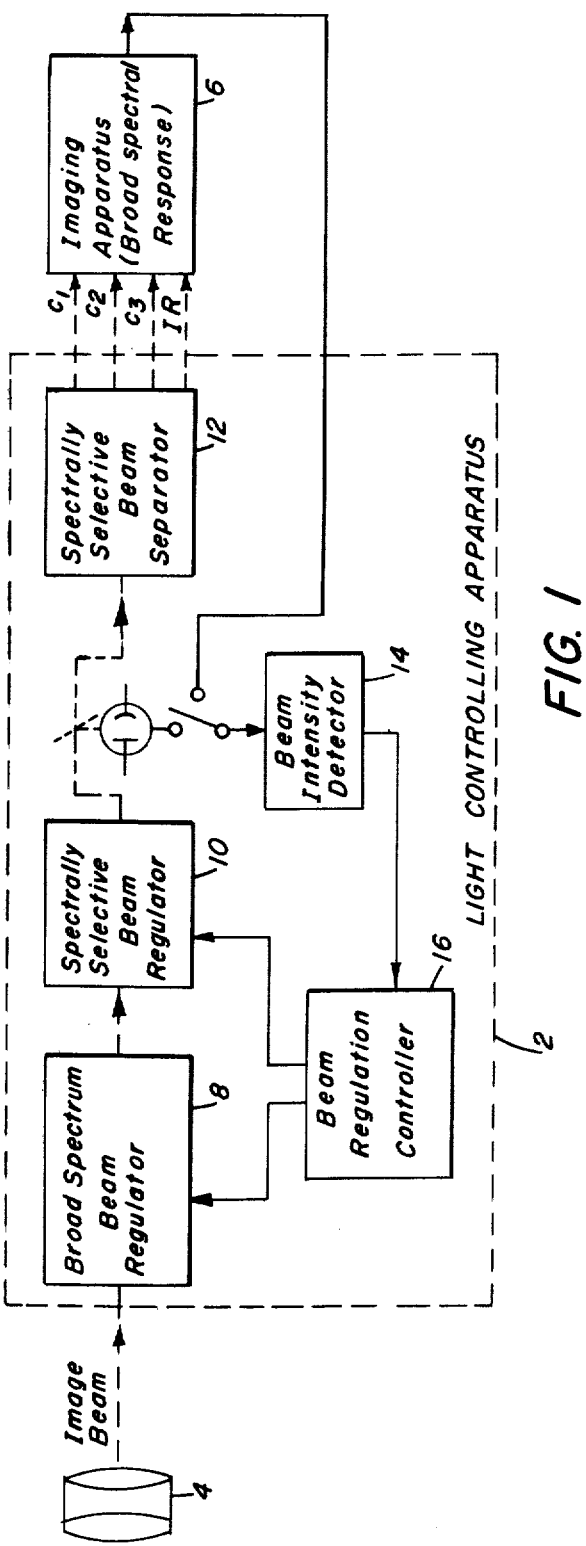
FIG. 1 is a simplified block diagram useful in explaining the invention.

The broad spectrum beam regulator responds according to an intensity-representative control signal and serves to attenuate the overall image beam irrespective of wavelength. The non-visible light component of the image beam is, furthermore, selectively attenuated by beam regulator 10. Such regulation may occur in a single step, for example, using a single controllably removable infrared filter, or may be gradual.

By separating the image beam according to a set of preselected primary wavelength bands (denoted $C_1$, $C_2$, and $C_3$), the spectrally selective beam separator 12 makes possible the extraction of color information from the image beam by the imaging apparatus 6. Because registry of the color information is critical to picture quality, the invention provides for beam control wherein the separator 12 is stationary and hence remains in the image beam for all modes of operation, including low light level operation. Maintaining the separator 12 stationary is achieved by selecting filters for beam separation, some or all of which pass non-visible light (preferably infrared) in addition to respective primary colors.

In order to control regulators 8 and 10, a beam intensity detector 14 samples the image beam and supplies to a beam regulation controller 16 an intensity signal upon which control signals to regulators 8 and 10 are based.

When adequate light levels are detected, the controller 16 causes the regulator 10 to block non-visible light and, consequently, only visible light, separated according to primary color by the separator 12, reaches the imaging apparatus 6. For low light levels, on the other hand, infrared is allowed to pass to the imaging apparatus 6 to supplement the faint visible light image. In either of the above-described modes of operation, broad spectrum regulator 8 adjusts image beam intensity to fall within the operative range of the imaging apparatus 6. Such regulation may be performed, for example, by means of a variable aperture or a graduated neutral density filter. With some types of imaging apparatus (e.g., vidicons), however, automatic gain adjustment can be substituted for controlled broad spectrum attenuation.

Figure 2:
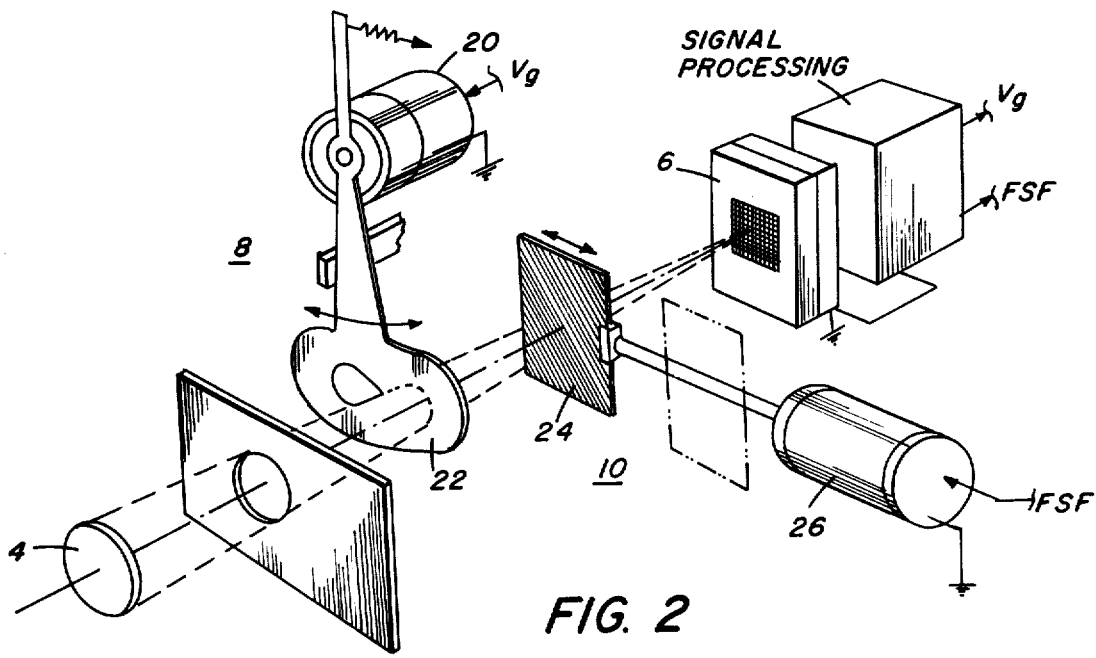
FIG. 2 is a perspective representation of a presently preferred implementation according to the invention.

A presently preferred implementation of the above-outlined invention will be described with reference to FIG. 2. For purposes of clarity, elements which are analogous but nonetheless somewhat different are distinguished in the figures by the use of primes.

Figure 3:
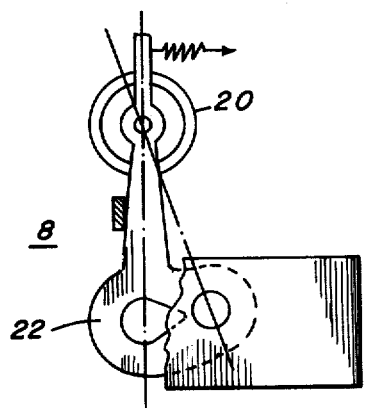
FIG. 3 is a front elevational view illustrating the rest position for an aperture control vane.

An imaging apparatus 6 receives scene information via the image beam formed by optics 4. Broad spectrum attenuation of the image beam is preferably effected by a variable aperture of the swinging vane type. The aperture size changes in accordance with the control signal Vg supplied to a motor 20 which positions a vane 22. In FIG. 3, there is shown the rest position for the vane 22. This rest position is chosen, according to a preferred feature of the invention, to block all light, as will be discussed more fully below. A suitable filter to block infrared, yet pass visible image beam components is the Eastman Kodak No. 301 interference filter. Absorption filters produced with dyes in nickel dithiolene or the tetra-substituted anthraquinone classes may also be used.

Spectrally selective beam regulation is provided by a filter apparatus 10 comprising an infrared filter 24 and a solenoid 26 which is arranged to withdraw the filter 24 from the image beam in response to a control signal SF.

Figure 4A:
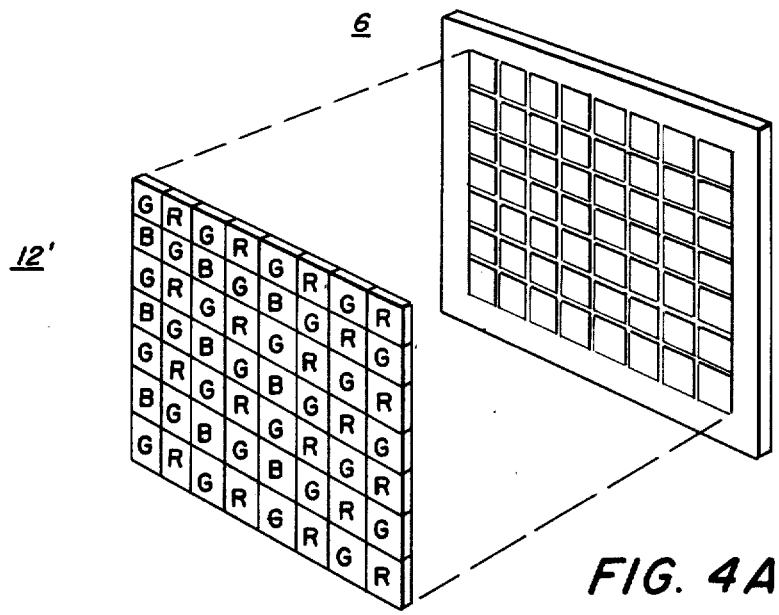
FIG. 4a is an exploded view of an imaging array and cooperating beam separator.

Referring now to FIG. 4A, spectrally selective beam separation is effected by a filter mosaic 12' (the letters R, B, G indicate the color transmitted as red, blue, and green, respectively) which cooperates with an imaging array 6, as described in U.S. Pat. No. 3,971,065. In FIG. 5, there are indicated the preferred filter characteristics for the mosaic 12'. It is important to note that the filters block two of the three preselected primary colors — but all transmit infrared. Suitable filter materials include No. 47 blue Wratten, No. 57 green Wratten, and No. 25 red Wratten. With such filters, the beam separating mosaic 12' need not be removed from the image beam and, therefore, the mosaic can be rigidly mounted within the camera while nonetheless allowing the regulators 8 and 10 to control infrared reaching the image apparatus 6.

(While the colors red, blue, and green are mentioned above, it will be appreciated that it is possible to select various other sets of primary colors and, in fact, a wavelength range corresponding to luminance may be selected to define one color of such a set of primary colors.)

Since such transmission filters will deteriorate as a result of extended exposure to light, it is a preferred feature for the invention to block light from the filters whenever the camera is not in use. Apparatus for providing such blocking was discussed above with respect to the broad spectrum regulator 8.

Figure 4B:
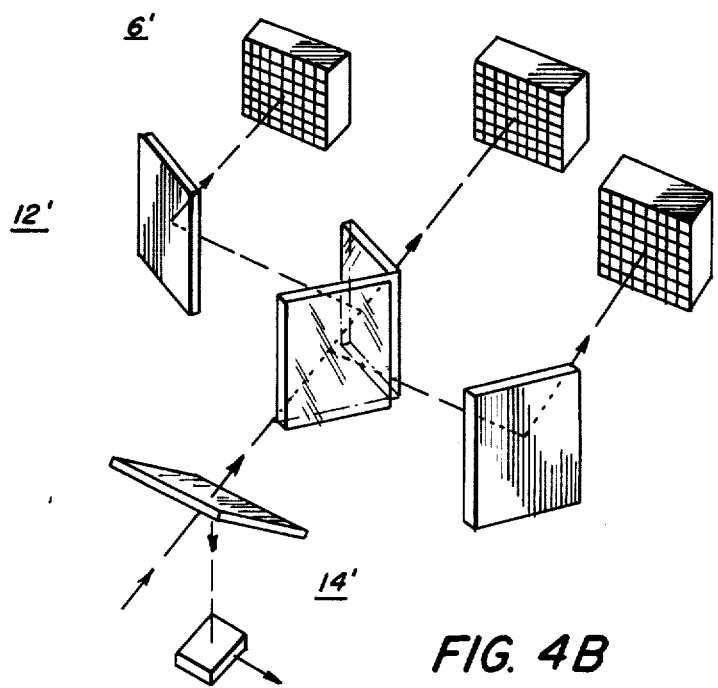
FIG. 4B is a perspective view of an alternative imaging apparatus and cooperating beam separator for use with the invention.

It should be appreciated that various types of imaging apparatus may be utilized in color video cameras according to the invention. For example, referring to FIG. 4B, a plurality of imaging devices 6 (e.g., semiconductor arrays or vidicons) are utilized in sensing respective primary colors which are separated by a set of dichroic filters 12″ as is known in the art. In accordance with the invention, infrared is not absorbed by filters 12″ but is allowed to reach one or more of devices 6. A partially reflecting mirror and cooperating photoresponsive device 14' are shown for sampling the image beam prior to separation and for providing a measure of beam intensity. Such operation is an alternative to deriving a measure of beam intensity based on the output signals of devices 6.

Figure 6:
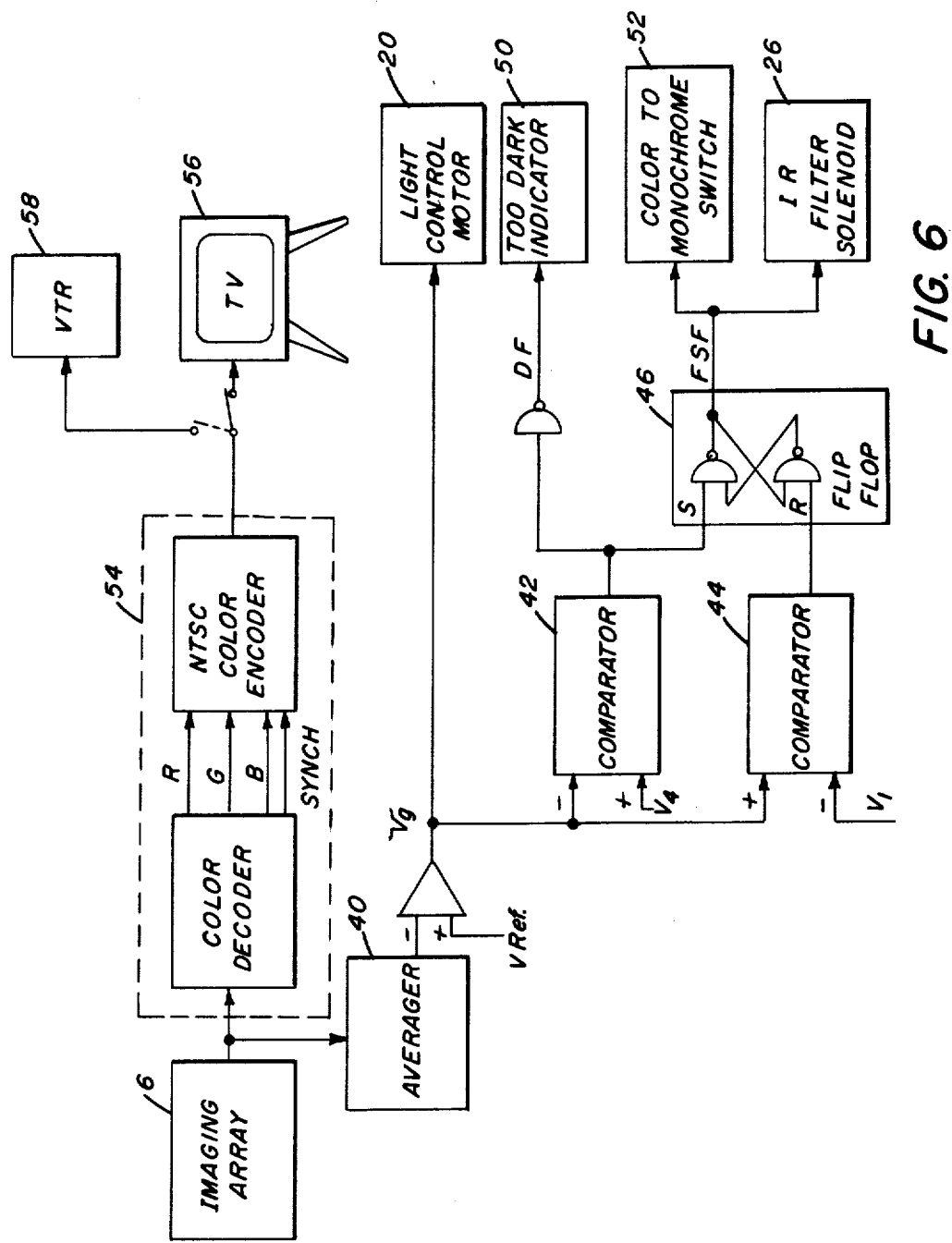
FIG. 6 is a block diagram of a circuit for use in the presently preferred implementation of the invention.
Figure 7:
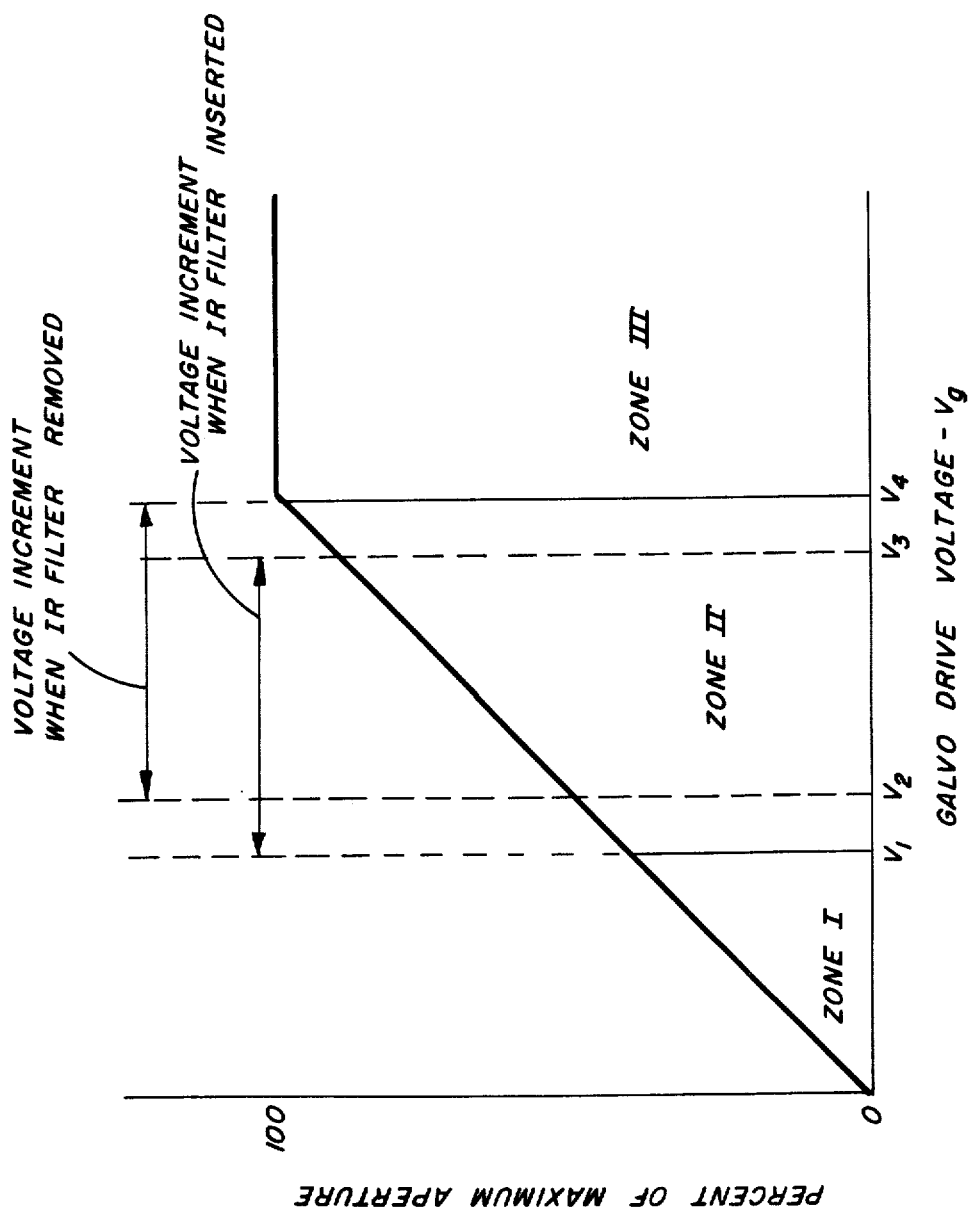
FIG. 7 indicates graphically operational zones defined for the aperture drive voltage of the presently preferred implementation.
Figures 8, 12:
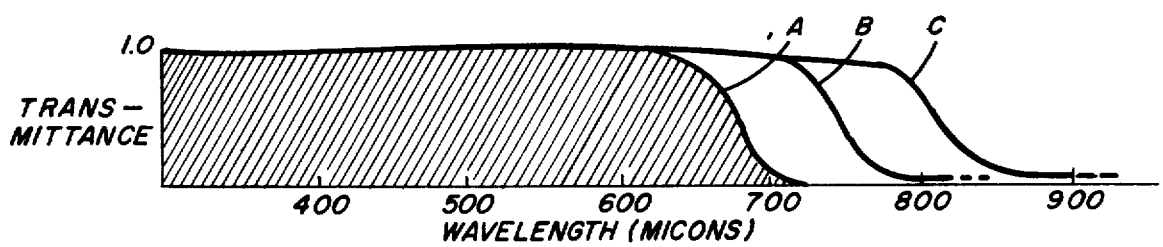
FIG. 8 is a table outlining the logic of operation of the presently preferred implementation.
FIG. 12 indicates graphically filter characteristics for the alternative implementation of FIG. 11.

Control circuitry adapted to cooperate with the apparatus of FIG. 2 will now be described with reference to FIG. 6. For the arrangement shown, the color image information produced by imaging array 6 is utilized to provide a measure of image beam intensity. Accordingly, color signal information from array 6 is supplied to an intensity statistic generator 40. The statistic generated is preferably the average of intensity for all three colors; however, it will be appreciated that many other measures of intensity are possible. For example, average luminance using the NTSC definition of luminance might be employed. More sophisticated measures using selected areas and weighting factors may also be employed, and suitable techniques for generating appropriate statistics are well known in the art for controlling exposures for photographic printing. Once generated, the intensity statistic is compared to a reference voltage $V_{ref}$ to generate an error signal Vg which provides, inter alia, a basis for controlling the motor 20 of the regulator 8 and the infrared filter solenoid 26. In FIG. 7, various operational zones are illustrated with respect to the signal Vg. FIG. 8 presents, in tabular form, the logic underlying operation of the circuitry of FIG. 6.

Figure 9:
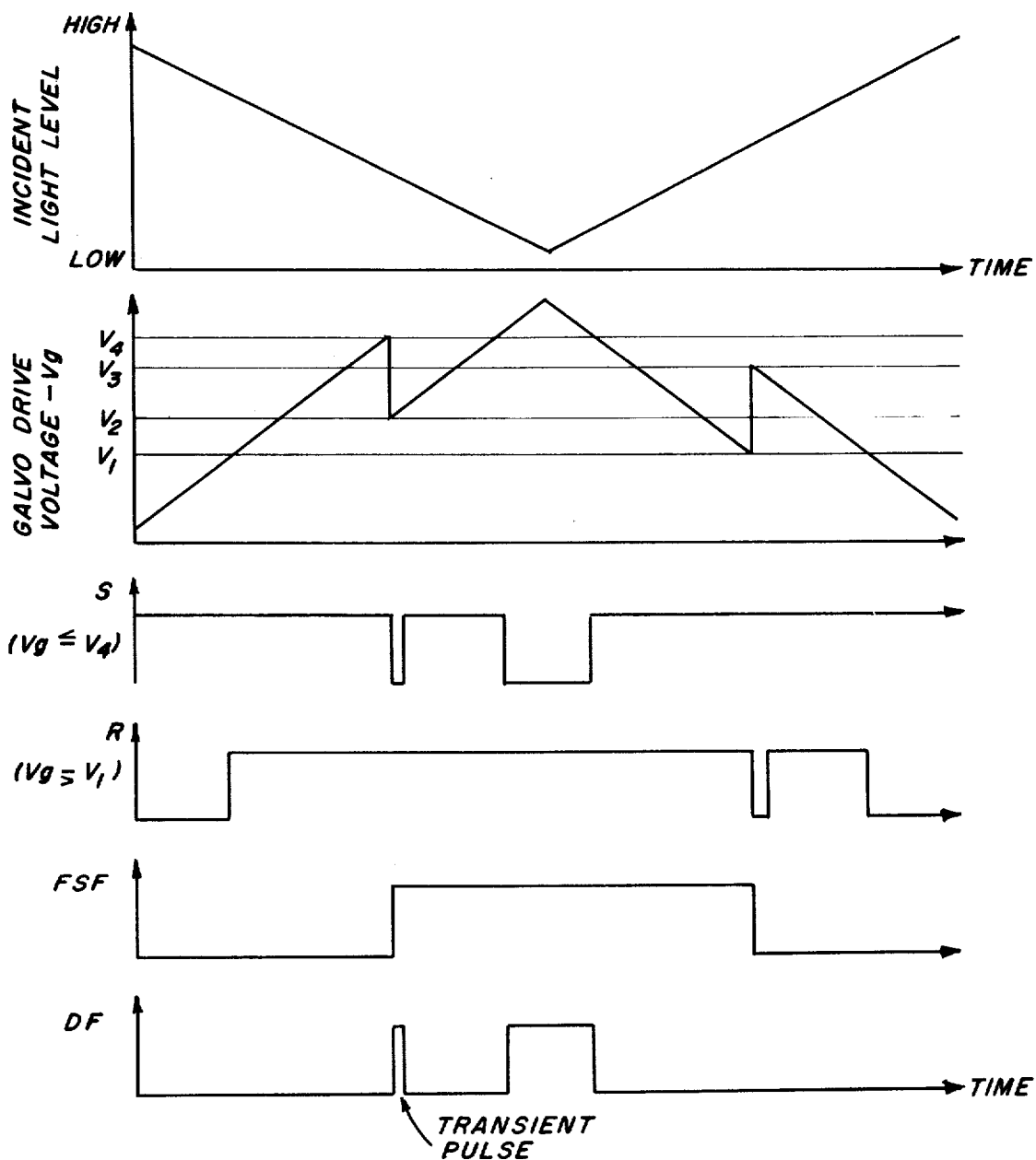
FIG. 9 indicates graphically certain voltage waveforms for the presently preferred implementation.

Referring again to FIG. 6, the signal Vg is compared with reference levels $V_4$ and $V_1$ at comparators 42 and 44, respectively. With this arrangement, comparator 42 is in a logic "1" state when Vg is in Zones I or II (see FIG. 7), and comparator 44 is in the logic "1" state when Vg is in Zones II or III. The flip-flop 46 is set by a one to zero transition in the output of the comparator 42 and is reset by a corresponding transition in the output of the comparator 44. The output signal of the flip-flop 46, denoted FSF, controls withdrawal of the infrared filter 10 (see FIG. 2) by the solenoid 26. Reference may be had to FIG. 9 for an indication of the waveforms for various signals, such as signal FSF, as a transition occurs from a high to a low light level and then back to a high light level.

An alarm indication is provided whenever there is insufficient scene light for even "low light" operation. To control initiation of the insufficient light indication, signal S is logically inverted to form a dark flag signal (DF) which actuates an indicator 50 when Vg is in Zone III with the infrared filter 10 withdrawn. In so using such a signal DF, a spurious pulse occurs as the infrared filter 10 is removed from the optical path. Such pulse is only momentary, however, and no special provision for removal need be made.

Broad spectrum regulation of the image beam to be within the operative intensity range of the imaging device 6 is effected by supplying the control signal Vg to the light control motor 20, thereby controlling actuation of the regulator 8.

Apparatus for utilizing the information signals from the array 6 is well known in the art and, for example, might include signal processing circuitry 54 and a video display 56 or a recorder 58.

Figure 10:
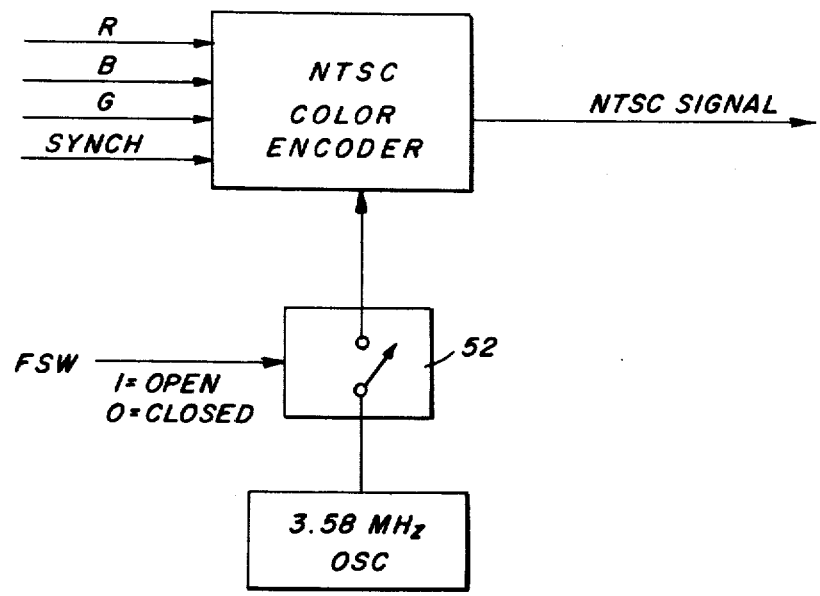
FIG. 10 is a block diagram of a color-to-monochrome switch.

According to a preferred technique for use in implementing the invention, the signal FSF also actuates a color-to-monochrome switch 52. Such a switch 52 is represented in FIG. 10 in a form for use with an NTSC format video system. As shown, the switch 52, when open, removes the color subcarrier of the NTSC signal. The reason this is done is to assure that under low light infrared, falling on the imaging apparatus, does not produce signals which modulate the 3.58 MHz subcarrier — which attendantly would cause unnatural color images to be displayed.

Figure 11:
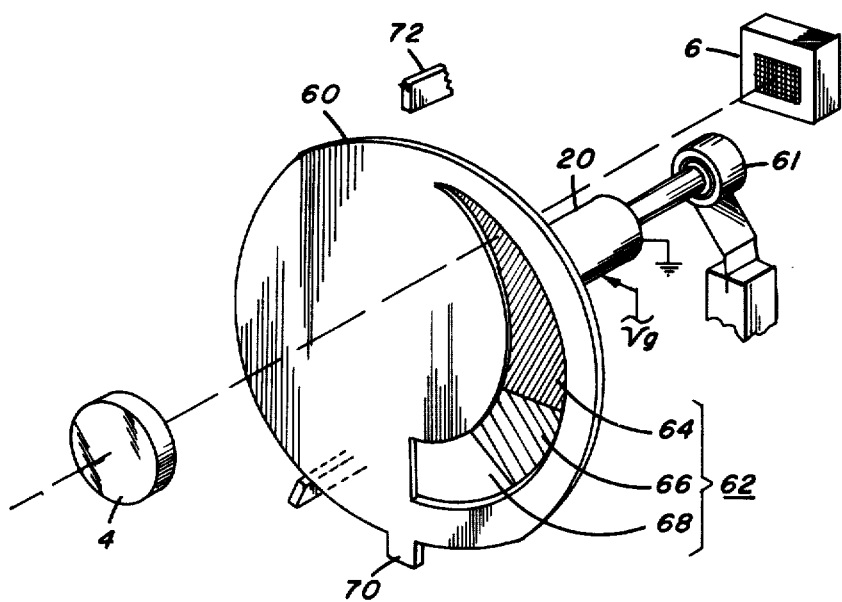
FIG. 11 is a perspective representation of an alternative implementation of the invention.

Referring now to FIG. 11, an alternative for implementing the invention will be described. A regulator disc 60 including a filter assembly 62 is arranged to be rotated in the image beam path by a motor 20. A first portion 64 of the filter assembly 62 is an infrared blocking filter in a tapered aperture. This first portion 64 provides a controllable attenuation of the visible beam by virtue of the tapered aperture and also blocks all infrared. At normal light levels, it is the portion 64 which modifies the image beam. A signal Vg for causing rotation of motor 20 is produced as described with reference to FIG. 6.

In accordance with a preferred practice of the invention, when the camera is not operating, no signal Vg is present to actuate motor 20. The disc 60 is, in the absence of a signal Vg, urged to a rest position by a spring 61. In the rest position, disc 60 blocks the image beam entirely. As the visible light image becomes faint, signal Vg increases, causing the motor 20 to rotate and, at a predetermined light level, a portion 66 of filter assembly 62 is positioned in the image beam. The portion 66 presents a wide aperture and transmits part of the infrared band in addition to visible light. Further reduction in light level increases the signal Vg, until a level is reached for causing a filter portion 68 to be moved into the image beam. Exemplary transmission characteristics for filter portions 64, 66, and 68 are illustrated in FIG. 12 as curves A, B, and C, respectively.

By this arrangement, broad spectrum regulation and spectrally selective regulation are incorporated in a single moving element, namely disc 60. It should be appreciated that a graduated neutral density filter could be substituted for the tapered aperture of the filter portion 64.

With the embodiment of FIG. 11, an "insufficient light" indicator would be activated based on the level of Vg or, alternatively, in response to a tab 70 on disc 60 striking a stop 72.

Color-to-monochrome switching is incorporated using means such as analog switch 52 shown in FIG. 10 which receives a logic "1" signal from a comparator (not shown) when signal Vg is above the predetermined level for which filter portion 66 is positioned in the image beam. With such switching, the camera is in the monochrome mode whenever infrared is allowed to reach the imaging device 6 and unnatural color representations are thereby avoided.

The invention has been described in detail with particular reference to preferred embodiments thereof, but it will be understood that variations and modifications can be effected within the spirit and scope of the invention. For example, various means may be employed for broad spectrum regulation, including controllably variable neutral density beam attenuation and signal responsive image sensor gain control. Moreover, various forms of imaging devices may be employed so long as they provide or can be adapted to provide sensitivity in a non-visible, as well as the visible, portion of the spectrum.

What is claimed is:

1. In a color video camera having means for defining an image beam of light reflected from a scene, apparatus comprising:
   a. at least one broad spectral response imaging device arranged in the path of the image beam;
   b. intensity measuring means for producing a signal relating to image beam intensity;
   c. a beam regulation controller for receiving the intensity signal from said measuring means and for producing at least one control signal corresponding to said intensity signal;
   d. a spectrally selective image beam regulator having means for selectively blocking portions of the image beam which are outside the visible spectrum in response to a control signal from said beam regulation controller; and
   e. a spectrally selective beam separator including filter means for separating the image beam, prior to arrival at said imaging device, according to three primary wavelength ranges which are a preselected basis for defining visible-light color images, said filter means permitting infrared light to pass with light of at least one said primary wavelength ranges whereby transmission of an infrared component of the image beam to influence said imaging device(s) is regulated by said image beam regulator and such regulation is related to image beam intensity by the control action of said beam regulation controller.

2. An apparatus according to claim 1 and further including a broad spectrum regulator responsive to the control signal from said controller for adjusting the response of said imaging device to be within a desired operating range.

3. An apparatus according to claim 2 wherein said broad spectrum regulator is an aperture regulator positioned in the image beam path and, when said aperture regulator includes means responsive to the control signal from said controller, for defining the size of a variable aperture through which the image beam passes.

4. An apparatus according to claim 2 wherein said broad spectrum regulator is graduated neutral density filter means positionable to attenuate the image beam in accordance with a control signal from said controller.

5. An apparatus according to claim 2 wherein said broad spectrum regulator is a gain control for said imaging device.

6. An apparatus according to claim 3 wherein means is provided for biasing said means for defining an aperture to block light when no control signal is received from said controller, such condition serving to indicate that the camera is not operating and, therefore, the image beam may be blocked from said filter means of said beam separator.

7. In a color video camera having a set of optics for defining an image beam, apparatus comprising:
   a. a broad-spectrum imaging array arranged to receive said image beam, said array being adapted to produce based thereon at least one image-representative signal;
   b. a spectrally selective mosaic of filters superposed on said array, said filters being of preselected types for transmitting respective colors from a set of primary colors, there being at least one type of said color filters which, in addition to transmitting a respective color, also transmits infrared;
   c. first processing means for receiving said image-representative signal(s) and for producing based thereon a measure of image beam intensity, said first processing means including means for producing at least one control signal in accordance with said measure;
   d. means for receiving said control signal and in response thereto regulating the infrared in the image beam; and
   e. second processing means for receiving said image-representative signal and for producing a video signal based thereon, said means being adapted to produce a color video signal and including switching means responsive to said control signal for converting said video camera to a monochrome mode of operation.

8. An apparatus according to claim 7 which further includes means responsive to said control signal for modifying operation of the camera to a monochrome mode.

9. An apparatus according to claim 7 for use in a color video camera of the type adapted to employ a color subcarrier to produce color signals in the NTSC format, said apparatus including means for changing camera operation to a monochrome mode in response to said control signal, said changing means including switching means for removing the color subcarrier when the control signal assumes a preselected state corresponding to low light level operation.

* * * * *